United States Patent
Behkish et al.

(10) Patent No.: US 10,188,998 B2
(45) Date of Patent: Jan. 29, 2019

(54) CATALYST ROLLER FOR GRAVITY-ASSISTED PARTICLE FLOW

(71) Applicant: ExxonMobil Research and Engineering Company, Annandale, NJ (US)

(72) Inventors: Arsam Behkish, Flemington, NJ (US); Michael F. Raterman, Doylestown, PA (US); Anjaneya S. Kovvali, Hemdon, VA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 15/924,734

(22) Filed: Mar. 19, 2018

(65) Prior Publication Data
US 2018/0296999 A1 Oct. 18, 2018

Related U.S. Application Data

(60) Provisional application No. 62/484,519, filed on Apr. 12, 2017.

(51) Int. Cl.
*B01J 8/10* (2006.01)
*B01J 4/00* (2006.01)
*B01J 8/00* (2006.01)

(52) U.S. Cl.
CPC ............. *B01J 8/10* (2013.01); *B01J 4/007* (2013.01); *B01J 8/002* (2013.01); *B01J 8/003* (2013.01);
(Continued)

(58) Field of Classification Search
CPC . B01J 8/0045; B01J 8/002; B01J 8/003; B01J 8/10; B01J 4/007; B01J 2208/00769; B01J 2208/00752
See application file for complete search history.

(56) References Cited

U.S. PATENT DOCUMENTS 2,489,925 A * 11/1949 Omwake .................. B01J 8/002
198/541
3,702,886 A 11/1972 Argauer et al.
(Continued)

FOREIGN PATENT DOCUMENTS

DE 2511411 A1 9/1976
DE 2712825 A1 9/1978

OTHER PUBLICATIONS

The International Search Report and Written Opinion of PCT/US2018/023075 dated Jun. 29, 2018.

*Primary Examiner* — Lessanework Seifu
(74) *Attorney, Agent, or Firm* — Liza Negron (57) ABSTRACT

Systems and methods are provided for controlling the flow and transport of catalyst particles within a reaction system. The flow of catalyst particles can be managed using a rotating disc or wheel that is configured within a roller volume to allow for control over the rate of catalyst flow while reducing or minimizing attrition of the catalyst particles. This can be achieved in part by maintaining a relationship between the center of the rotating disc, the inlet for catalyst particles to the roller volume, and the top wall of the roller volume so that catalyst particles are not exposed to compressive forces and/or abrasion during rotation of the disc. Additionally or alternately, the disc and roller volume surfaces can be configured to reduce or minimize the potential for catalyst particles to become trapped in "dead space" regions within the roller volume. By using a disc to provide force for transport of particles through the roller volume, the speed of catalyst movement can be controlled at relatively slow catalyst flow rates with a reduced or minimized risk for clogging or plugging within the roller volume.

20 Claims, 2 Drawing Sheets

(52) U.S. Cl.
CPC ........ *B01J 8/0045* (2013.01); *B01J 2204/002* (2013.01); *B01J 2208/00769* (2013.01)

(56) References Cited

U.S. PATENT DOCUMENTS

| | | | |
|---|---|---|---|
| 3,709,979 | A | 1/1973 | Chu |
| RE29,948 | E | 3/1979 | Dwyer et al. |
| 4,427,136 | A * | 1/1984 | MacKay ................. G01F 11/24 222/368 |
| 4,582,815 | A | 4/1986 | Bowes |
| 4,685,482 | A | 8/1987 | Smith et al. |
| 4,687,382 | A | 8/1987 | Smith |
| 5,916,529 | A | 6/1999 | Scheuerman |
| 2009/0178336 | A1 | 7/2009 | Van Der Ploeg |

* cited by examiner

CATALYST ROLLER FOR GRAVITY-ASSISTED PARTICLE FLOW

CROSS-REFERENCE TO RELATED APPLICATIONS

This application claims the benefit of U.S. Provisional Application No. 62/484,519, filed on Apr. 12, 2017, the entire contents of which are incorporated herein by reference.

FIELD

This invention relates to systems and methods for movement of catalyst particles within a reaction system, such as a reaction system including a moving bed reactor.

BACKGROUND

Fluidized bed reactors and moving bed reactors are examples of reactors where catalyst particles within the reactor are in motion during operation of the reactor. Based on the movement of the catalyst, it is possible to withdraw catalyst from a reactor during operation. This can allow for replacement and/or regeneration of catalyst. Unfortunately, the movement of catalyst within a reactor can lead to catalyst attrition due to collisions of catalyst particles with other catalyst particles and/or surfaces within a reactor. In addition to causing increased catalyst replacement costs, attrition of catalyst particles can potentially allow catalyst fragments and/or catalyst particles of reduced size to become entrained in the product effluent, with the result that catalyst fragments and/or reduced size particles may travel to unintended portions of a reaction system.

Some types of systems for controlling solid particle transport within a reaction system can include an "L"-valve. U.S. Pat. Nos. 4,685,482 and 4,687,382 describe examples of L-valve systems for controlling particle transport. One difficulty with L-valve systems is that a dead zone for catalyst particles can occur at the 90° angle in the L-valve flow path. Other difficulties can be related to the required fluid flow for the L-valve to operate. In situations where catalyst particles are separated from the liquid product effluent prior to passing through the L-valve, an additional gas flow can be required to induce movement of the catalyst particles through the L-valve. This can create difficulties in controlling the flow rate of the catalyst particles in situations where lower flow rates are desired.

SUMMARY

In various aspects, a catalyst roller system is provided. The catalyst roller system can include a roller volume comprising a top interior surface, a sidewall, and an inner contour surface. The catalyst roller system can further include a plurality of catalyst particles within the roller volume. The plurality of catalyst particles can correspond to, for example, catalyst particles from a reactor that are being transported out of the reactor for regeneration and/or recycle. The plurality of catalyst particles can have an average catalyst particle diameter, an angle of repose and an angle of internal friction. The catalyst roller system can further include a catalyst inlet in fluid communication with the roller volume via the top surface. The catalyst roller system can further include a catalyst exit in fluid communication with the roller volume. The catalyst roller system can also include a catalyst roller disc. The catalyst roller disc can be rotatably mounted within the roller volume to allow for transport of catalyst particles by rotation of the disc. The direction of rotation of the disc can carry catalyst particles from a region near the catalyst inlet and toward the catalyst exit. A gap or contour clearance can be present between the mounted catalyst roller disc and the inner contour surface. The contour clearance can be less than half of the average catalyst particle diameter for at least one location, in order to prevent catalyst from traveling past the catalyst roller disc in the direction opposite to the direction of rotation. Based on the configuration in the roller volume, a catalyst stoppage angle can be defined by a) a top of the mounted catalyst roller disc, b) an intersection of the catalyst inlet and the top interior surface at the closest intersection point to the top of the mounted catalyst roller disc, and c) a tangent line passing through the top of the mounted catalyst roller disc. The catalyst stoppage angle can have a value within 15% of the angle of repose, or within 10%, or within 5%.

In some aspects, the roller volume is in fluid communication with the catalyst exit via a discharge cone. The discharge cone can optionally have an angle relative to vertical greater than or equal to the angle of internal friction. Additionally or alternately, the roller volume can further include a bottom surface. In such aspects, the roller volume can be in fluid communication with at least one of the catalyst exit and the discharge cone via the bottom surface. Optionally, a ratio of a) a bottom clearance between the bottom surface and the catalyst roller disc and b) the average catalyst particle diameter can be 0.5 or less.

In some aspects, a ratio of a) a top clearance between the top interior surface and the top of the catalyst roller disc and b) the average catalyst particle diameter is 2.0 to 10, or 3.0 to 8.0, or 5.0 to 7.0. Additionally or alternately, a ratio of a) a sidewall clearance between the sidewall and the catalyst roller disc and b) the average catalyst particle diameter is 4.0 to 25, or 5.0 to 20.

In some aspects, the roller volume can further include an inner guide surface, an angle of the inner guide surface, relative to vertical, being greater than or equal to the angle of internal fraction. Optionally, the at least one location can correspond to an intersection of the inner contour surface and the inner guide surface. Optionally, the inner contour surface can be a surface that is removably mounted within the roller volume. In some aspects, the contour clearance is less than half of the average catalyst particle diameter for a portion of the circumference of the catalyst roller disc corresponding to 2 average catalyst particle diameters or more. Optionally, the inner contour surface can further include a gas passage. During operation, the gas passage can be in fluid communication with a source of pressurized fluid, such as a pressurized gas.

In some aspects, the catalyst roller disc can include a disc edge having undulations, wherein i) a ratio of an average undulation height of the undulations to the average catalyst particle diameter is 0.5 or less (or 0.3 or less); or ii) a ratio of an average undulation wavelength to the average catalyst particle diameter is 0.8 or more (or 1.0 or more); or iii) a combination of i) and ii).

In some aspects, the average catalyst particle diameter can be 0.5 mm to 5.0 mm, or 0.5 mm to 10 mm, or 0.5 mm to 20 mm.

In various other aspects, a method for transporting catalyst particles is provided. The method can include passing a plurality of catalyst particles into a roller volume of a catalyst roller system via a catalyst inlet. The roller volume can correspond to a roller volume as described above, such as a roller volume that includes a rotatably mounted catalyst roller disc. At least one catalyst particle of the plurality of catalyst particles can be in contact with an edge of the mounted catalyst roller disc. The mounted catalyst roller disc can rotate at a rotation speed to pass the one or more catalyst particles into a catalyst exit. A catalyst stoppage angle can be defined by a) a top of the mounted catalyst roller disc, b) an intersection of the catalyst inlet and the top interior surface at the closest intersection point to the top of the mounted catalyst roller disc, and c) a tangent line passing through the top of the mounted catalyst roller disc. The catalyst stoppage angle can have a value within 15% of the angle of repose (or within 10%, or within 5%). In some aspects, the catalyst roller system can be in fluid communication with a reactor comprising a reactor catalyst volume. In such aspects, the rotating of the mounted catalyst roller disc can correspond to rotation at a speed to allow turnover of 0.01 wt % to 10 wt % of the reactor catalyst volume per hour.

DETAILED DESCRIPTION

In various aspects, systems and methods are provided for controlling the flow and transport of catalyst particles within a reaction system, such as a reaction system that includes a moving bed reactor. The flow of catalyst particles can be managed using a rotating disc or wheel that is configured within a roller volume to allow for control over the rate of catalyst flow while reducing or minimizing attrition of the catalyst particles. This can be achieved in part by maintaining a relationship between the center of the rotating disc, the inlet for catalyst particles to the roller volume, and the top wall of the roller volume so that catalyst particles are not exposed to compressive forces and/or abrasion during rotation of the disc. Additionally or alternately, the disc and roller volume surfaces can be configured to reduce or minimize the potential for catalyst particles to become trapped in "dead space" regions within the roller volume. By using a disc to provide force for transport of particles through the roller volume, the speed of catalyst movement can be controlled at relatively slow catalyst flow rates with a reduced or minimized risk for clogging or plugging within the roller volume.

As noted above, L-valves provide one example of a structure used to facilitate catalyst transport. In applications where a catalyst is fluidized with a condensed phase fluid, such as catalyst particles in a slurry, difficulties with controlling flow of catalyst particles can be somewhat mitigated. However, for systems where the fluid for driving catalyst flow is a gas phase fluid, L-valves can pose a variety of challenges. In particular, a minimum gas flow rate is typically required before any movement can be induced in the catalyst particles. Once this minimum gas flow rate is achieved, the velocity of particle flow can change discontinuously. This can make it difficult to control catalyst particle flow when low rates of catalyst flow are desired. Additionally, when a gas phase fluid is used, L-valve configurations can potentially have "dead spaces" corresponding to catalyst particles that remain in the L-valve without moving.

Another option for controlling catalyst transport within a reaction system can be to use a star valve configuration. In a star valve, a series of spoke-like platforms can rotate around a central pivot point within a volume. As catalyst enters the volume, the catalyst can land on one of the platforms, where the catalyst remains until the star valve rotates enough to allow the catalyst to exit from the platform on the other side of the valve. Unfortunately, in situations where an excess of catalyst is available and waiting to enter the star valve, catalyst particles can become trapped between the edge of a platform and the wall(s) of the volume containing the star valve. This can lead to substantial catalyst attrition. The initial rush of catalyst onto a platform when the rotation of the valve allows access to a new platform can also be a substantial source of catalyst particle attrition. In particular, as rotation of the valve causes a new platform to become available, the new platform can initially represent an empty volume. The full weight of the catalyst particles waiting to enter the star valve can be exerted on the catalyst particles entering this empty volume above a platform. This can cause high-force impacts of catalyst particles with the platform and/or other catalyst particles.

One or more of the difficulties with conventional methods for controlling catalyst particle movement in a reaction system can be mitigated or overcome by use of a catalyst roller system. A catalyst roller system can have a reduced or minimized amount of dead space, so that all catalyst entering the catalyst roller system can pass through. The catalyst roller system can also have a reduced or minimized tendency to cause catalyst attrition. In particular the catalyst roller system can reduce or minimize attrition due to catalyst particles being compressed between surfaces within the catalyst roller system. Additionally or alternately, the rate of catalyst entering empty or available volumes within the catalyst roller can be controlled, so that the number and/or severity of particle-particle impacts is mitigated.

Definitions

The term "angle of repose" refers to the angle of a cone (or other mound-like shape) formed by catalyst particles of a given type as the catalyst particles accumulate on a surface. The angle is formed due to the fact that gravitational pull is sufficient to cause catalyst particles at an angle greater than the angle of repose to slide down a cone or mound of catalyst particles.

The term "angle of internal friction" refers to the maximum angle (determined relative to the direction of gravitational pull) of surface for which catalyst particles placed on the surface will still fall freely based on gravitational force unless supported by another surface.

In this discussion, for an angle that is determined relative to "vertical", the vertical direction is defined to the direction of gravitational force.

The term "average catalyst particle diameter" is used to generally refer to an average diameter for a plurality of catalyst particles. The diameter of a catalyst particle is defined as the diameter of the smallest bounding sphere that can contain the catalyst particle.

Example of Catalyst Roller Configuration

Figure 1:
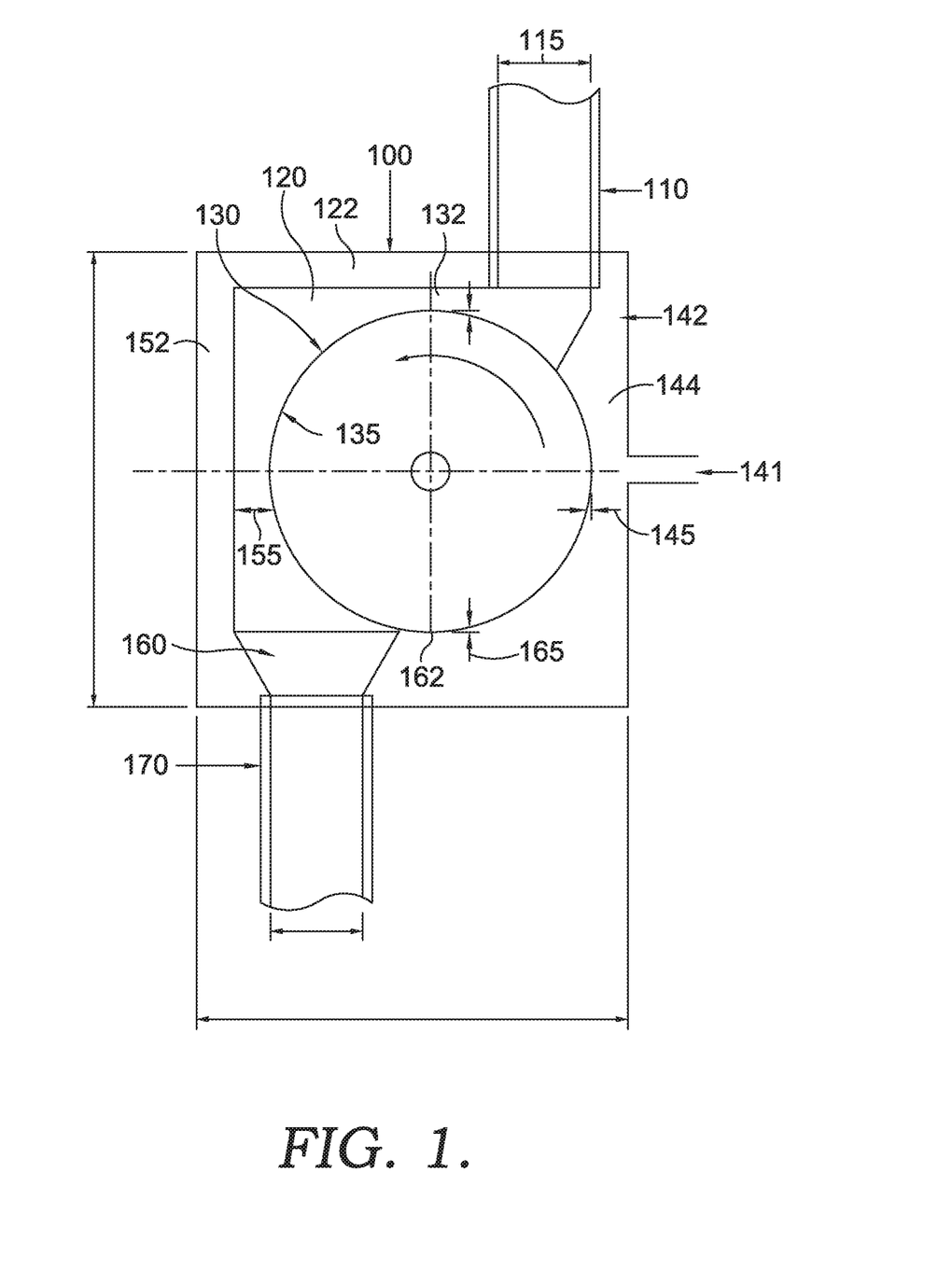
FIG. 1 schematically shows an example of a catalyst roller system for catalyst transport.

FIG. 1 shows an example of a catalyst roller configuration. In FIG. 1, catalyst particles can enter the catalyst roller system 100 via catalyst inlet 110. Catalyst inlet 110 has a characteristic width 115. In some aspects, the characteristic width 115 can correspond to an internal diameter for a catalyst inlet 110 with a round/oval/ovoid shape. In some aspects, the characteristic width 115 can correspond to the length of a side of the catalyst inlet for a catalyst inlet 110 with a substantially square/rectangular/parallelogram shape.

Catalyst inlet 110 is in fluid communication with roller volume 120, which houses a catalyst roller disc 130 having a diameter 135. The catalyst roller disc 130 can be rotatably mounted within the roller volume 120. References to catalyst roller disc 130 are understood to refer to catalyst roller disc as mounted within the roller volume 120. The top 132 of (mounted) catalyst roller disc 130 can be separated from the top interior surface 122 of roller volume 120 by a top clearance 125. In some aspects, top clearance 125 can be selected to be related to the average particle diameter (or other characteristic length) of catalyst particles being transported via the catalyst roller system. In such aspects, a ratio of top clearance 125 to the average particle diameter of the catalyst particles can be between about 2.0 to about 10.0, or about 4.0 to about 8.0, or about 5.0 to about 7.0. For example, for an average particle diameter of 1.5 mm and a ratio of top clearance to average particle diameter of 6.0, the top clearance can correspond to a distance of 9.0 mm.

Figure 2:
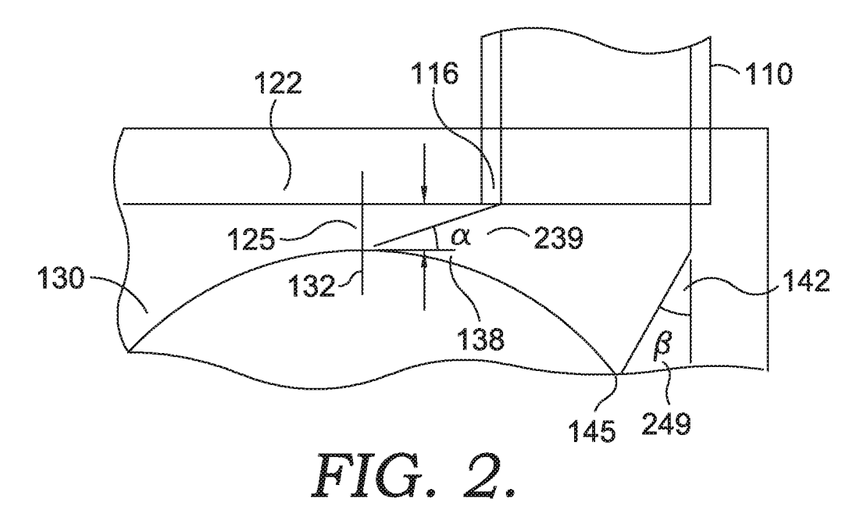
FIG. 2 schematically shows a top portion of a catalyst roller.

FIG. 2 shows a larger scale view of a portion of the catalyst roller system 100. In FIG. 2, angle 239 is formed between the points defined by: a) the bottom left edge 116 of catalyst inlet 110 at the location where catalyst inlet 110 intersects with the top interior surface 122 of roller volume 120; b) the top 132 of catalyst roller disc 130; and c) the tangent line 138 that passes through the top of 132 of catalyst roller disc 130. To avoid ambiguity, because the intersection of catalyst inlet 110 with top interior surface 122 will typically define a 2-dimensional level surface, the closest point on the 2-dimensional level surface to the catalyst roller disc (i.e., bottom left edge 116) can be selected for defining angle 239. To avoid ambiguity, the tangent line 138 is defined as a tangent line that is orthogonal to the axis of rotation of the catalyst roller disc. It is noted that selecting a desired value for angle 239 and a desired ratio of top clearance 125 to average particle diameter can allow for determination of a location for top 132 of catalyst roller disc 130. The angle 239 can be referred to as a catalyst stoppage angle.

In various aspects, angle 239 can be selected so that the value of angle 239 is within a tolerance value of the angle of repose for the catalyst particles to rest on top of the roller. The tolerance value can correspond to the value of the angle 239 being within 15% of the angle of repose, or within 10%, or within 5%. In this discussion, the value of angle 239 being equal to the angle of repose is defined as being within a given tolerance. A tolerance around the angle of repose is calculated based on the measured value for a given catalyst particle. For example, for a catalyst particle having an angle of repose of 21°, any value of angle 239 that is between 18.9° and 23.1° is defined as being within 10% of the angle of repose. When angle 239 has a value within a tolerance relative to the angle of repose for the catalyst particles, during rotation of catalyst roller disc 130, the maximum height of any particles accumulated on the catalyst roller disc 130 can typically be less than the top clearance 125. This can reduce or minimize the potential for catalyst particles to experience crush forces as the particles pass between catalyst roller disc 130 and the top interior surface 122 of roller volume 120.

Returning to FIG. 1, on one side of the roller volume 120, inner contour surface 144 can be adjacent to catalyst roller disc 130 for at least one location, in order to prevent (or at least minimize) travel of catalyst particles between inner contour surface 144 and catalyst roller disc 130. Inner guide surface 142 represents a guide surface that directs catalyst particles toward the catalyst roller disc 130 along a line different from a tangent line to the catalyst roller disc. In some aspects, the intersection of inner guide surface 142 and inner contour surface 144 can correspond to a minimum value for contour clearance 145. In some aspects, the angle 249 (as shown in FIG. 2) of inner guide surface 142, relative to vertical, can be greater than or equal to the angle of internal friction for the catalyst particles. This can reduce or minimize the likelihood of catalyst particles becoming trapped due to resting on the inner contour surface 142 without contacting the catalyst roller. The contour clearance 145 between inner contour surface 144 and catalyst roller disc 130, for at least one location (such as the intersection of inner guide surface 142 and inner contour surface 144), can be about 0.9 times the average catalyst particle diameter or less, or about 0.5 times or less, or about 0.3 times or less, or about 0.2 times or less. Preferably, the contour clearance 145 between inner contour surface 144 and catalyst roller disc 130 can be maintained at 0.9 times the average catalyst particle diameter or less (or 0.5 times or less, or 0.3 times or less, or 0.2 times or less) for a portion of the circumference of the catalyst roller disc 130 that corresponds to 2 average catalyst particle diameters or more, or 5 average catalyst particle diameters or more, or 10 average catalyst particle diameters or more, such as up to substantially the length of the inner contour surface. To further reduce or minimize passage of catalyst particles between inner contour surface 144 and catalyst roller disc 130, passage 141 can allow for introduction of pressurized fluid (such as a pressurized gas) into contour clearance 145. The pressurized fluid can correspond to an inert gas such as nitrogen, any other convenient gas, or any other convenient fluid.

On the side of the roller volume 120 that is toward the direction of travel of the catalyst particles, sidewall 152 can be separated from catalyst roller disc 130 by a sidewall clearance 155. The sidewall clearance corresponds to the minimum distance between catalyst roller disc 130 and sidewall 152. In some aspects, sidewall clearance 155 can be at least as large as the top clearance 125. In some aspects, a ratio of sidewall clearance 155 to the average catalyst particle diameter can be between about 4.0 to about 25.0, or about 5.0 to about 20.0, or about 8.0 to about 15.0. As catalyst roller disc 130 rotates, catalyst particles residing on the surface of catalyst roller disc 130 can move from the top toward the side of the catalyst roller disc 130. The movement toward the side of the catalyst roller disc 130 can cause the catalyst particles to fall from the surface of catalyst roller disc 130 and pass through sidewall clearance 155 toward discharge cone 160. Discharge cone 160 provides fluid communication between roller volume 120 and catalyst exit 170. In some aspects, discharge cone 160 can be optional, with catalyst exit 170 starting at bottom surface 162 of roller volume 120. In aspects where discharge cone 160 is present, the angle of the discharge cone, relative to vertical, can preferably be greater than or equal to the angle of internal friction for the catalyst particles. The diameter (or other characteristic length) of catalyst exit 170 can correspond to any convenient value, such as having a diameter similar to the diameter of catalyst inlet 110. For example, a ratio of the diameter of catalyst exit 170 to diameter of catalyst inlet 110 can be 0.8 or greater, or 1.0 or greater, or 1.2 or greater, such as up to 5.0 or still greater.

In some aspects, the bottom clearance 165 between bottom surface 162 and catalyst roller disc 130 can be similar to the contour clearance 145. In such aspects, the bottom clearance 165 between bottom surface 162 and catalyst roller disc 130, for at least one location, can be about 0.5 times the average catalyst particle diameter or less, or about 0.3 times or less, or about 0.2 times or less. Preferably, the bottom clearance 165 between bottom surface 162 and catalyst roller disc 130 can be maintained at 0.5 times the average catalyst particle diameter or less (or 0.3 times or less, or 0.2 times or less) for portion of the circumference of the catalyst roller disc 130. The portion of the circumference can correspond to 1 average catalyst particle diameters or greater, or 2 average catalyst particle diameters or greater, or 5 average catalyst particle diameters or greater, or 10 average catalyst particle diameters or greater. In other aspects, any convenient bottom clearance 165 can be present between bottom surface 162 and catalyst roller disc 130.

In some aspects, the bottom clearance 165 and contour clearance 145 can be maintained at 0.5 times the average catalyst particle diameter or less (or 0.3 times or less, or 0.2 times or less) for substantially all of the portion of the circumference of catalyst roller disc 130 that is between a) the initial meeting point of inner angle wall 142 and catalyst roller disc 130, and b) the initial meeting point of bottom surface 162 and catalyst roller disc 130. Optionally, the initial meeting point of bottom surface 162 and catalyst roller disc 130 can correspond to the meeting point between bottom surface 162 and discharge cone 160. To further reduce or minimize passage of catalyst particles between bottom surface 162 and catalyst roller disc 130, passage 141 can allow for introduction of pressurized fluid (such as pressurized gas) into bottom clearance 165. The pressurized gas/fluid can correspond to an inert gas such as nitrogen, or any other convenient gas/fluid.

Figure 3:
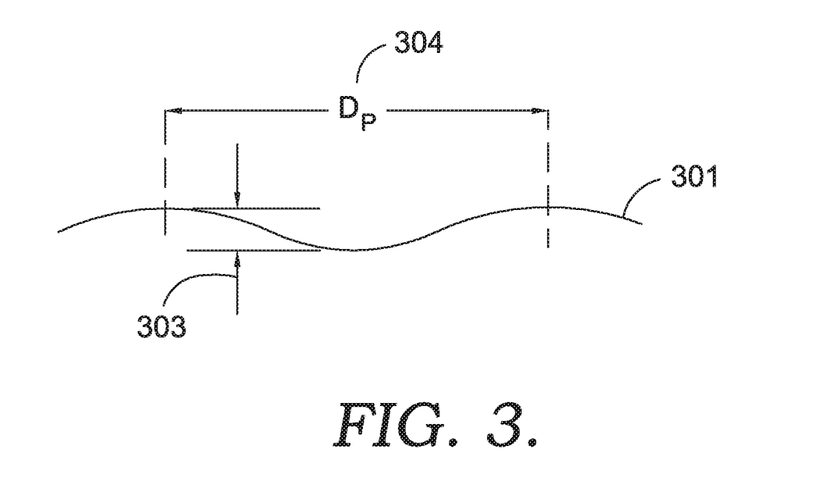
FIG. 3 schematically shows an example of a surface of the wheel in a catalyst roller system.

With regard to the catalyst roller disc 130, in some aspects the disc can have a substantially uniform diameter, so that the disc edge where catalyst rests during movement on the catalyst roller disc is uniform. In other aspects, the catalyst roller disc edge can have surface undulations so that the surface varies in a periodic manner or a roughly periodic manner. In still other aspects, the catalyst roller disc edge can have variations in surface height of a periodic or non-periodic nature. In such aspects, the surface undulations and/or other variations in height can potentially provide improved transport of catalyst particles by the disc. FIG. 3 schematically shows an example of a portion of the outer surface 301 or disc edge of a catalyst roller disc. In FIG. 3, the outer surface 301 can include undulations that vary in an approximately periodic fashion. Distance 303 in FIG. 3 corresponds to the difference between the maximum height and minimum height of the undulation at the surface. This could optionally be viewed as the difference between the "maximum diameter" and "minimum diameter" of the disc. In various aspects, a ratio of average undulation height (determined based on an average of the undulations on the catalyst roller disc surface) to the average catalyst particle diameter can be 0.5 or less, or 0.3 or less, or 0.2 or less. More generally, for variations in the surface height of a periodic or non-periodic nature, the difference between the maximum diameter and minimum diameter of the disc relative to the average catalyst particle diameter can correspond to a ratio of 0.8 or less, or 0.5 or less. Distance 304 in FIG. 3 corresponds to the periodicity or wavelength for the undulation. In various aspects, a ratio of the average undulation wavelength (average of peak to peak distance for undulations/other periodic height variations on the catalyst roller disc surface) to the average catalyst particle diameter can be 0.8 or more, or 1.0 or more, or 1.2 or less. Having a combination of a relatively shallow undulations (in comparison with the average catalyst particle diameter) and a relatively long wavelength undulations can allow for improved transport of catalyst particles while reducing or minimizing the likelihood of catalyst particles becoming trapped on the surface of the disc.

During operation, catalyst can enter the catalyst roller system 100 via catalyst inlet 110. The catalyst inlet 110 can be in fluid communication with, for example, the internal reactor volume of a moving bed reactor. Catalyst can fall through catalyst inlet 110 until the catalyst comes to rest within roller volume 120 and/or within catalyst inlet 110. The catalyst can come to rest on a surface within roller volume 120, such as the surface of catalyst roller disc 130; or the catalyst can come to rest on other catalyst already present within the catalyst roller system 100. Catalyst roller disc 130 can rotate in a direction so that catalyst resting on the surface of catalyst roller disc 130 (and/or on top of other catalyst particles resting on the disc) can be moved toward sidewall 152. As catalyst roller disc 130 continues to rotate, at some point the gravitational pull can overcome the frictional forces on the surface of catalyst roller disc 130, thus allow the catalyst to fall toward discharge cone 160.

During operation, a catalyst roller system can be operated with any convenient speed for the catalyst roller disc. It is noted that catalyst transport is controlled based on frictional forces between catalyst particles and/or between catalyst particles and the catalyst roller disc. This can allow for operation of the catalyst roller disc at arbitrarily low rotational speeds while still providing catalyst transport. This is in contrast to conventional L-valve catalyst transport systems, where a minimum fluid flow rate can be required prior to achieving any catalyst transport. It is further noted that catalyst transport at slow speeds can be substantially continuous, which is in contrast to the behavior of a star valve at low rotational speeds. The rotation speed of the catalyst roller disc can correspond to any convenient speed to achieve a desired amount of catalyst turnover within a reactor. The catalyst turnover for a reactor can be defined as a weight percent, based on weight of catalyst particles that pass through the catalyst roller volume per hour relative to the total weight of catalyst particles in the reactor. In various aspects, the rotation speed of the catalyst roller disc can allow for turnover of about 0.001 wt % per hour to about 10 wt % per hour of the total catalyst weight within a reactor volume, or 0.001 wt % per hour to 1.0 wt % per hour, or 0.1 wt % per hour to 10 wt % per hour.

In some aspects, the location of the catalyst roller disc 130 within the catalyst roller system 100 can be variably mounted, so that, for example, the angle 239 and/or the location of the top 132 of catalyst roller disc 130 can be adjusted to accommodate different types of catalysts. Adjustments to the location of catalyst roller disc 130 could be made based on differences in average catalyst particle diameter, differences in the angle of repose between catalysts, differences in any other catalyst particle physical properties, and/or for any other convenient reason. Similarly, the other surfaces within the catalyst roller system, such as the inner contour surface, can also be adjusted to maintain desired relationships and/or clearances within the roller volume.

Catalyst Particles

The catalyst particles transported using a catalyst roller system can correspond to any convenient type of catalyst particle. An example of a typical catalyst particle diameter can be about $1/16^{th}$ of an inch (0.063 inches, or ~1.6 mm). More generally, an average catalyst particle diameter for a sample of catalyst particles can range from about 0.5 mm to about 20 mm, or about 0.5 mm to about 10 mm, or about 0.5 mm to about 5.0 mm. Because a large plurality of catalyst particles are typically present within a reaction system that could employ a catalyst roller system, it can be convenient to characterize catalyst particles based on an average catalyst particle diameter. An average catalyst particle diameter for a large plurality of particles can be determined by any convenient method, such as by withdrawing a sample of at least 100 catalyst particles and determining an average catalyst particle diameter for the sample.

In some aspects, a catalyst roller system can be beneficial for transport of catalyst particles that have a higher susceptibility for attrition. One option for characterizing whether a catalyst particle is susceptible to attrition can be based on the crush strength of the catalyst particle. In this discussion, crush strength for a particle can correspond to an individual particle crush strength. ASTM D4179 and ASTM D6175 provide methods for determining the crush strength of an individual particle, depending on the nature of the particle. If the crush strength of a catalyst particle is not suitable for determination under either ASTM 4179 or ASTM D6175, a bulk crush strength value determined according to ASTM D7084 may be used instead. In some aspects, the crush strength can be about 500 psi/in or less, or about 300 psi/in or less, or about 150 psi/in or less.

Catalysts for Oxygenate Conversion

An example of a reaction that can be performed using a moving bed reactor is oxygenate conversion, where a feed containing methanol, dimethyl ether, and/or other alcohols can be converted to larger hydrocarbons, with the larger hydrocarbons possible including a substantial portion of olefins and/or aromatics. A transition metal-enhanced zeolite catalyst composition is an example of a catalyst that can be suitable for conversion of oxygenate feeds to naphtha boiling range fractions and olefins. In this discussion and the claims below, a zeolite is defined to refer to a crystalline material having a porous framework structure built from tetrahedra atoms connected by bridging oxygen atoms. Examples of known zeolite frameworks are given in the "Atlas of Zeolite Frameworks" published on behalf of the Structure Commission of the International Zeolite Association", 6$^{th}$ revised edition, Ch. Baerlocher, L. B. McCusker, D. H. Olson, eds., Elsevier, New York (2007) and the corresponding web site, http://www.iza-structure.org/databases/. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, and/or other transition metals that can substitute for silicon and/or aluminum in a zeolitic framework.

A suitable zeolite can include a 10-member or 12-member ring pore channel network, such as a 1-dimensional 10-member ring pore channel or a 3-dimensional 10-member ring pore channel. Examples of suitable zeolites having a 3-dimensional 10-member ring pore channel network include zeolites having an MFI or MEL framework, such as ZSM-5 or ZSM-11. ZSM-5 is described in detail in U.S. Pat. Nos. 3,702,886 and Re. 29,948. ZSM-11 is described in detail in U.S. Pat. No. 3,709,979. Preferably, the zeolite is ZSM-5. Examples of suitable zeolites having a 1-dimensional 10-member ring pore channel network include zeolites having a MRE (ZSM-48), MTW, TON, MTT, and/or MFS framework. In some aspects, a zeolite with a 3-dimensional pore channel can be preferred for conversion of methanol, such as a zeolite with an MFI framework.

In some aspects, it may be desirable to convert methanol (and/or other oxygenates) to small olefins, such as $C_2$ and/or $C_3$ olefins. In such aspects, zeolites with 8-member rings as the largest pore channel may be suitable for the conversion reaction. SAPO-34 is an example of an 8-member ring zeolite that can convert methanol to small olefins. Other examples can include zeolites having a framework structure of CHA (such as SAPO-34), RHO, AEI, LTA, KFI, and/or DDR.

Generally, a zeolite having desired activity for methanol conversion can have a silicon to aluminum molar ratio of about 10 to about 200, or about 15 to about 100, or about 20 to about 80, or about 20 to about 40. For example, the silicon to aluminum ratio can be at least about 10, or at least about 20, or at least about 30, or at least about 40, or at least about 50, or at least about 60. Additionally or alternately, the silicon to aluminum ratio can be about 300 or less, or about 200 or less, or about 100 or less, or about 80 or less, or about 60 or less, or about 50 or less.

Typically, reducing the silicon to aluminum ratio in a zeolite will result in a zeolite with a higher acidity, and therefore higher activity for cracking of hydrocarbon or hydrocarbonaceous feeds, such as petroleum feeds. However, with respect to conversion of oxygenates to aromatics, such increased cracking activity may not be beneficial, and instead may result in increased formation of residual carbon or coke during the conversion reaction. Such residual carbon can deposit on the zeolite catalyst, leading to deactivation of the catalyst over time. Having a silicon to aluminum ratio of at least about 40, such as at least about 50 or at least about 60, can reduce or minimize the amount of additional residual carbon that is formed due to the acidic or cracking activity of a catalyst.

It is noted that the molar ratio described herein is a ratio of silicon to aluminum. If a corresponding ratio of silica to alumina were described, the corresponding ratio of silica ($SiO_2$) to alumina ($Al_2O_3$) would be twice as large, due to the presence of two aluminum atoms in each alumina stoichiometric unit. Thus, a silicon to aluminum ratio of 10 corresponds to a silica to alumina ratio of 20.

In some aspects, a zeolite in a catalyst can be present at least partly in the hydrogen form. Depending on the conditions used to synthesize the zeolite, this may correspond to converting the zeolite from, for example, the sodium form. This can readily be achieved, for example, by ion exchange to convert the zeolite to the ammonium form followed by calcination in air or an inert atmosphere at a temperature of about 400° C. to about 700° C. to convert the ammonium form to the active hydrogen form.

Additionally or alternately, a zeolitic catalyst can include and/or be enhanced by a transition metal. Preferably the transition metal is a Group 12 metal from the IUPAC periodic table (sometimes designated as Group IIB) selected from Zn, Cd, or a combination thereof. More generally, the transition metal can be any convenient transition metal selected from Groups 6-15 of the IUPAC periodic table. The transition metal can be incorporated into the zeolite/catalyst by any convenient method, such as by impregnation, by ion exchange, by mulling prior to extrusion, and/or by any other convenient method. Optionally, the transition metal incorporated into a zeolite/catalyst can correspond to two or more metals. After impregnation or ion exchange, the transition metal-enhanced catalyst can be treated in air or an inert atmosphere at a temperature of about 400° C. to about 700° C. The amount of transition metal can be expressed as a weight percentage of metal relative to the total weight of the catalyst (including any zeolite and any binder). A catalyst can include about 0.05 wt % to about 20 wt % of one or more transition metals, or about 0.1 wt % to about 10 wt %, or about 0.1 wt % to about 5 wt %, or about 0.1 wt % to about 2.0 wt %. For example, the amount of transition metal can be at least about 0.1 wt % of transition metal, or at least about 0.25 wt % of transition metal, or at least about 0.5 wt %, or at least about 0.75 wt %, or at least about 1.0 wt %. Additionally or alternately, the amount of transition metal can be about 20 wt % or less, or about 10 wt % or less, or about 5 wt % or less, or about 2.0 wt % or less, or about 1.5 wt % or less, or about 1.2 wt % or less, or about 1.1 wt % or less, or about 1.0 wt % or less. Optionally, the catalyst can further include phosphorus.

A catalyst composition can employ a transition metal-enhanced zeolite in its original crystalline form or after formulation into catalyst particles, such as by extrusion. The catalyst composition can optionally include one or more additional binders. Suitable binders for zeolite-based catalysts can include various inorganic oxides, such as silica, alumina, zirconia, titania, silica-alumina, cerium oxide, magnesium oxide, yttrium oxide, or combinations thereof. For catalysts including a binder, the catalyst can comprise at least about 10 wt % zeolite, or at least about 30 wt %, or at least about 50 wt %, such as up to about 90 wt % or more. Generally, a binder can be present in an amount between about 1 wt % and about 90 wt %, for example between about 5 wt % and about 40 wt % of a catalyst composition. In some aspects, the catalyst can include at least about 5 wt % binder, such as at least about 10 wt %, or at least about 20 wt %. Additionally or alternately, the catalyst can include about 90 wt % or less of binder, such as about 50 wt % or less, or about 40 wt % or less, or about 35 wt % or less. Combining the zeolite and the binder can generally be achieved, for example, by mulling an aqueous mixture of the zeolite and binder and then extruding the mixture into catalyst pellets. A process for producing zeolite extrudates using a silica binder is disclosed in, for example, U.S. Pat. No. 4,582,815. Optionally, a bound catalyst can be steamed after extrusion.

Example of Catalyst Roller System and Catalyst Particle Dimensions

The following is a prophetic example. In this example, a catalyst roller system is used for movement of catalyst within a reaction system including a moving bed reactor. The catalyst is a bead with an average catalyst particle diameter of 1.6 mm and a sphericity close to 1. It is determined that the catalyst particles had an angle of repose of 20° and an angle of internal friction of about 30°.

During operation of the reaction system, catalyst particles pass from the reactor into the inlet for the catalyst roller system. In the catalyst roller system, the catalyst roller disc has a diameter of 100 mm. The top clearance between the disc and the roller volume is 8.0 mm. The sidewall clearance is 13.0 mm. The contour clearance and the bottom clearance are 0.4 mm. The angle defined by the bottom of the catalyst inlet wall, the top of the disc, and the tangent to the disc is 20°, which is equal to the angle of repose for the catalyst particles. The angle of approach of the inner angle wall as it approaches the disc is 30°. The exit cone also has an angle of 30°. The surface of the disc includes undulations. The difference between the maximum and minimum height of the disc is 0.4 mm. The distance between maxima on the disc is roughly 1.6 mm. The roller disc speed is set to move about 4.2 wt % per hour of the total catalyst charge in the reactor.

Additional Embodiments

Embodiment 1. A catalyst roller system, comprising: a roller volume comprising a top interior surface, a sidewall, and an inner contour surface; a plurality of catalyst particles within the roller volume, the plurality of catalyst particles comprising an average catalyst particle diameter, the catalyst particles having an angle of repose and an angle of internal friction; a catalyst inlet in fluid communication with the roller volume via the top surface; a catalyst exit in fluid communication with the roller volume; and a catalyst roller disc rotatably mounted within the roller volume, a contour clearance between the mounted catalyst roller disc and the inner contour surface being less than half of the average catalyst particle diameter for at least one location, wherein a catalyst stoppage angle defined by a) a top of the mounted catalyst roller disc, b) an intersection of the catalyst inlet and the top interior surface at the closest intersection point to the top of the mounted catalyst roller disc, and c) a tangent line passing through the top of the mounted catalyst roller disc, has a value within 15% of the angle of repose.

Embodiment 2. The catalyst roller system of Embodiment 1, wherein the roller volume is in fluid communication with the catalyst exit via a discharge cone, the discharge cone having an angle relative to vertical greater than or equal to the angle of internal friction.

Embodiment 3. The catalyst roller system of any of the above embodiments, wherein the roller volume further comprises a bottom surface, the roller volume being in fluid communication with at least one of the catalyst exit and the discharge cone via the bottom surface.

Embodiment 4. The catalyst roller system of Embodiment 3, wherein a ratio of a) a bottom clearance between the bottom surface and the catalyst roller disc and b) the average catalyst particle diameter is 0.5 or less.

Embodiment 5. The catalyst roller system of any of the above embodiments, wherein a ratio of a) a top clearance between the top interior surface and the top of the catalyst roller disc and b) the average catalyst particle diameter is 2.0 to 10, or 3.0 to 8.0, or 5.0 to 7.0.

Embodiment 6. The catalyst roller system of any of the above embodiments, wherein the roller volume further comprises an inner guide surface, an angle of the inner guide surface, relative to vertical, being greater than or equal to the angle of internal fraction, the at least one location optionally comprising an intersection of the inner contour surface and the inner guide surface.

Embodiment 7. The catalyst roller system of any of the above embodiments, wherein the inner contour surface comprises a surface removably mounted within the roller volume, or wherein the contour clearance is less than half of the average catalyst particle diameter for a portion of the circumference of the catalyst roller disc corresponding to 2 average catalyst particle diameters or more, or a combination thereof.

Embodiment 8. The catalyst roller system of any of the above embodiments, wherein a ratio of a) a sidewall clearance between the sidewall and the catalyst roller disc and b) the average catalyst particle diameter is 4.0 to 25 (or 5.0 to 20).

Embodiment 9. The catalyst roller system of any of the above embodiments, wherein the inner contour surface further comprises a gas passage, the gas passage optionally being in fluid communication with a source of pressurized fluid.

Embodiment 10. The catalyst roller system of any of the above embodiments, wherein the catalyst roller disc comprises a disc edge having undulations, wherein i) a ratio of an average undulation height of the undulations to the average catalyst particle diameter is 0.5 or less (or 0.3 or less); or ii) a ratio of an average undulation wavelength to the average catalyst particle diameter is 0.8 or more (or 1.0 or more); or iii) a combination of i) and ii).

Embodiment 11. The catalyst roller system of any of the above embodiments, wherein the average catalyst particle diameter is 0.5 mm to 5.0 mm, or 0.5 mm to 10 mm, or 0.5 mm to 20 mm.

Embodiment 12. The catalyst roller system of any of the above embodiments, wherein the catalyst stoppage angle has a value within 10% of the angle of repose, or within 5%.

Embodiment 13. A method for transporting catalyst particles comprising use of a system according to any of Embodiments 1-12.

Embodiment 14. A method for transporting catalyst particles, comprising: passing a plurality of catalyst particles into a roller volume of a catalyst roller system via a catalyst inlet, the roller volume comprising a rotatably mounted catalyst roller disc, at least one catalyst particle of the plurality of catalyst particles contacting an edge of the mounted catalyst roller disc; and rotating the mounted catalyst roller disc at a rotation speed to pass the one or more catalyst particles into a catalyst exit, wherein a catalyst stoppage angle defined by a) a top of the mounted catalyst roller disc, b) an intersection of the catalyst inlet and the top interior surface at the closest intersection point to the top of the mounted catalyst roller disc, and c) a tangent line passing through the top of the mounted catalyst roller disc, has a value within 15% of the angle of repose (or within 10%, or within 5%).

Embodiment 15. The method of Embodiment 14, wherein the catalyst roller system is in fluid communication with a reactor comprising a reactor catalyst volume, the rotating of the mounted catalyst roller disc comprising rotation at a speed to allow turnover of 0.001 wt % to 10 wt % of the reactor catalyst volume per hour, or 0.001 wt % to 1.0 wt %, or 0.1 wt % to 10 wt %.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A catalyst roller system, comprising:
    a roller volume comprising a top interior surface, a sidewall, and an inner contour surface;
    a plurality of catalyst particles within the roller volume, the plurality of catalyst particles comprising an average catalyst particle diameter, the catalyst particles having an angle of repose and an angle of internal friction;
    a catalyst inlet in fluid communication with the roller volume via the top surface;
    a catalyst exit in fluid communication with the roller volume; and
    a catalyst roller disc rotatably mounted within the roller volume, a contour clearance between the mounted catalyst roller disc and the inner contour surface being less than half of the average catalyst particle diameter for at least one location,
    wherein a catalyst stoppage angle defined by
        a) a top of the mounted catalyst roller disc,
        b) an intersection of the catalyst inlet and the top interior surface at the closest intersection point to the top of the mounted catalyst roller disc, and
        c) a tangent line passing through the top of the mounted catalyst roller disc,
    has a value within 15% of the angle of repose.

2. The catalyst roller system of claim 1, wherein the roller volume is in fluid communication with the catalyst exit via a discharge cone, the discharge cone having an angle relative to vertical greater than or equal to the angle of internal friction.

3. The catalyst roller system of claim 1, wherein a ratio of a) a top clearance between the top interior surface and the top of the catalyst roller disc and b) the average catalyst particle diameter is 2.0 to 10.

4. The catalyst roller system of claim 1, wherein the roller volume further comprises an inner guide surface, an angle of the inner guide surface, relative to vertical, being greater than or equal to the angle of internal fraction.

5. The catalyst roller system of claim 4, wherein the at least one location comprises an intersection of the inner contour surface and the inner guide surface.

6. The catalyst roller system of claim 1, wherein the inner contour surface comprises a surface removably mounted within the roller volume.

7. The catalyst roller system of claim 1, wherein the contour clearance is less than half of the average catalyst particle diameter for a portion of the circumference of the catalyst roller disc corresponding to 2 average catalyst particle diameters or more.

8. The catalyst roller system of claim 1, wherein a ratio of a) a sidewall clearance between the sidewall and the catalyst roller disc and b) the average catalyst particle diameter is 4.0 to 25.

9. The catalyst roller system of claim 1, wherein the inner contour surface further comprises a gas passage, the gas passage optionally being in fluid communication with a source of pressurized fluid.

10. The catalyst roller system of claim 1, wherein the catalyst roller disc comprises a disc edge having undulations, wherein i) a ratio of an average undulation height of the undulations to the average catalyst particle diameter is 0.5 or less; or ii) a ratio of an average undulation wavelength to the average catalyst particle diameter is 0.8 or more; or iii) a combination of i) and ii).

11. The catalyst roller system of claim 1, wherein the roller volume further comprises a bottom surface, the roller volume being in fluid communication with at least one of the catalyst exit and the discharge cone via the bottom surface.

12. The catalyst roller system of claim 11, wherein a ratio of a) a bottom clearance between the bottom surface and the catalyst roller disc and b) the average catalyst particle diameter is 0.5 or less.

13. The catalyst roller system of claim 1, wherein the average catalyst particle diameter is 0.5 mm to 5.0 mm.

14. The catalyst roller system of claim 1, wherein the catalyst stoppage angle has a value within 10% of the angle of repose.

15. A method for transporting catalyst particles, comprising:
    passing a plurality of catalyst particles into a roller volume of a catalyst roller system via a catalyst inlet, the roller volume comprising a rotatably mounted catalyst roller disc, at least one catalyst particle of the plurality of catalyst particles contacting an edge of the mounted catalyst roller disc; and
    rotating the mounted catalyst roller disc at a rotation speed to pass the one or more catalyst particles into a catalyst exit,
    wherein a catalyst stoppage angle defined by
        a) a top of the mounted catalyst roller disc, b) an intersection of the catalyst inlet and the top interior surface at the closest intersection point to the top of the mounted catalyst roller disc, and c) a tangent line passing through the top of the mounted catalyst roller disc, has a value within 15% of the angle of repose.

16. The method of claim 15, wherein the average catalyst particle diameter is 0.5 mm to 10 mm.

17. The method of claim 15, wherein the catalyst stoppage angle has a value within 10% of the angle of repose.

18. The method of claim 15, wherein a ratio of a) a top clearance between a top interior surface and the top of the catalyst roller disc and b) the average catalyst particle diameter is 2.0 to 10.

19. The method of claim 15, wherein a contour clearance between the mounted catalyst roller disc and an inner contour surface is less than half of the average catalyst particle diameter for at least one location.

20. The method of claim 15, wherein the catalyst roller system is in fluid communication with a reactor comprising a reactor catalyst volume, the rotating of the mounted catalyst roller disc comprising rotation at a speed to allow turnover of 0.001 wt % to 10 wt % of the reactor catalyst volume per hour.

\* \* \* \* \*